(12) United States Patent
McCracken et al.

(10) Patent No.: US 8,141,855 B2
(45) Date of Patent: Mar. 27, 2012

(54) FILM STRETCHER

(75) Inventors: John McCracken, Knoxville, TN (US);
Mike Carroll, Knoxville, TN (US);
Adan Akerman, Knoxville, TN (US);
Thomas Shope, Oak Ridge, TN (US)

(73) Assignee: Inventure Laboratories, Inc., Knoxville, TN (US)

( * ) Notice: Subject to any disclaimer, the term of this patent is extended or adjusted under 35 U.S.C. 154(b) by 760 days.

(21) Appl. No.: 12/237,351

(22) Filed: Sep. 24, 2008

(65) Prior Publication Data
US 2009/0104299 A1    Apr. 23, 2009

Related U.S. Application Data

(60) Provisional application No. 60/974,835, filed on Sep. 24, 2007.

(51) Int. Cl.
*B23B 5/16* (2006.01)
*B29C 55/00* (2006.01)

(52) U.S. Cl. ............. 269/43; 425/66; 269/99; 269/113

(58) Field of Classification Search ........... 269/90, 269/34, 55, 60, 111, 113, 58, 43, 44; 425/66, 425/383, 394, DIG. 53; 73/826, 833; 264/291
See application file for complete search history.

(56) References Cited

U.S. PATENT DOCUMENTS

| 2,759,217 | A | * | 8/1956 | Peterson | 264/291 |
| 2,918,696 | A | | 12/1959 | Bottoms et al. | |
| 3,315,301 | A | * | 4/1967 | Dibblee et al. | 425/394 |
| 3,579,718 | A | * | 5/1971 | Miller et al. | 425/383 |
| 5,127,866 | A | * | 7/1992 | Adler et al. | 269/34 |
| 6,487,902 | B1 | * | 12/2002 | Ghosh | 73/826 |

FOREIGN PATENT DOCUMENTS

WO  WO2005/011958  2/2005

OTHER PUBLICATIONS

PCT/US2008/077577, International Search Report dated Dec. 29, 2008.
PCT/US2008/077577, Written Opinion, dated Dec. 29, 2008.
Photo of a High Pressure Pneumatic Stretch Head from Bruckner, Inc., known to exist more than 1 year before the present invention, more than a year prior to Sep. 24, 2007.
Photo of a High Pressure Pneumatic Stretch Head from T.M. Long Company, known to exist more than 1 year before the present invention, more than a year prior to Sep. 24, 2007.

* cited by examiner

*Primary Examiner* — Hadi Shakeri
(74) *Attorney, Agent, or Firm* — Withers & Keys, LLC

(57) ABSTRACT

A film stretcher utilizes a spring bias to clamp the film. The film stretcher may include a stretch head having one or more clamps positioned about the film in locations necessary to clamp the film for stretching in one or more axes. The clamp may utilize a spring to provide the clamping force. The stretch head may include structures that operate to counter the spring bias to move the clamp to one state and then to allow the spring bias to move the clamp to another state. Thus, the stretch head may effectively clamp and unclamp the film.

5 Claims, 10 Drawing Sheets

US 8,141,855 B2

FILM STRETCHER

RELATED APPLICATIONS

The present application claims priority to U.S. Provisional Application 60/974,835 filed on Sep. 24, 2007, which is incorporated by reference herein.

TECHNICAL FIELD

Embodiments provide for a device that stretches films such as those constructed of polymers or similar materials.

BACKGROUND

Biaxial orientation resulting from biaxial stretching is a common way to achieve mechanical, optical, or transmissive properties in extruded or cast films ranging from potato chip bags to water bottles to nicotine patches. A laboratory grade instrument is used in the development of the production processes for a material, ongoing verification during production, and/or support of material scientists who are developing new materials and products. There are many instrumentation options for studying films; however, the primary data generated directly by these instruments are stress-strain curves.

With laboratory biaxial film stretchers, the film sample is clamped on all four sides with the clamps forming a pantograph mechanism. Thus a uniform strain may be applied on opposite sides as the film is stretched in the pantograph mechanism. The pantograph mechanism may often hold the film sample within an oven where temperature can be increased to a desired point since temperature may be a factor whose impact is being determined by the laboratory experimentation.

Conventional laboratory film stretchers utilize pneumatics to operate clamps of the pantograph mechanism. These pneumatics utilize small tubes that stretch from one clamp to the next so that the pneumatic pressure is communicated across all of the clamps for all four sides of the pantograph mechanism. The use of pneumatics for the clamps presents several issues. The tubes exert measurable forces on the clamps during movement of the stretching process, and this force introduces noise into the stress-strain curves being produced. Furthermore, the pneumatics include O-rings and other items that are made of materials that are affected by environmental factors. For example, the pneumatics employ a very dry nitrogen that degrades the O-rings. Furthermore, high temperatures that may be present within the oven during testing and such materials may break down over relatively short intervals. Failures of parts such as O-rings in the clamping system may result in poor clamping of the film sample and ultimately unreliable test results.

DETAILED DESCRIPTION

Embodiments provide for clamping fingers that use springs to bias clamps of the clamping fingers so that stretch head may employ such clamping fingers in place of pneumatic clamping fingers. Embodiments further provide mechanisms for controlling a state of spring bias of the clamping fingers where the state of spring bias is related to the clamps being in an open or clamped position.

Figure 1:
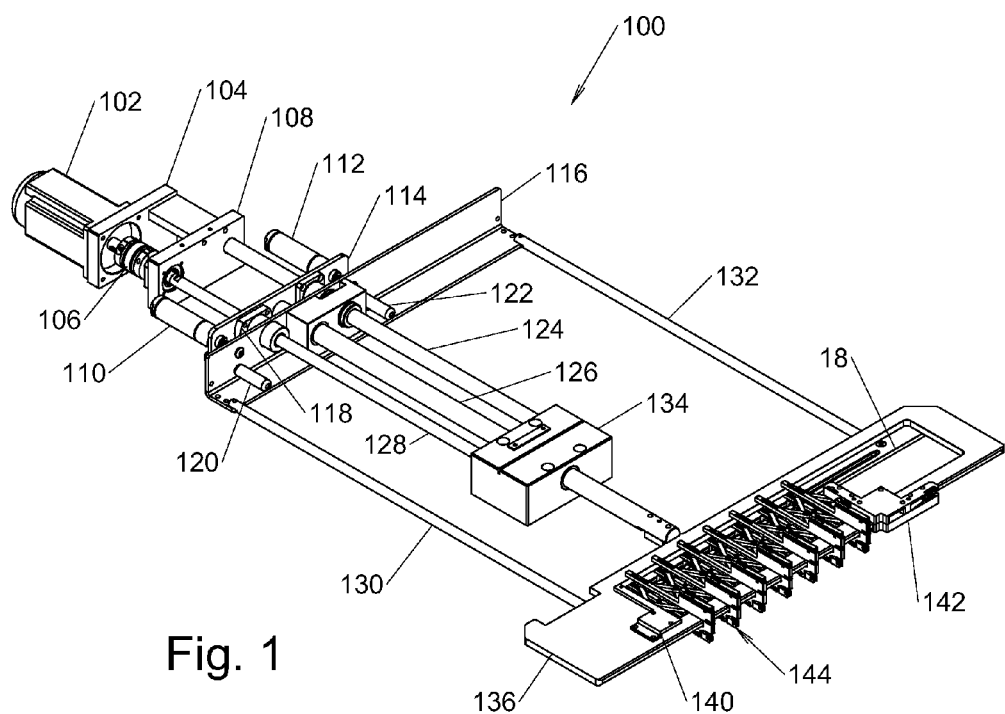
FIG. 1 shows a perspective view of an embodiment of a film stretcher for a given axis.
Figure 2:
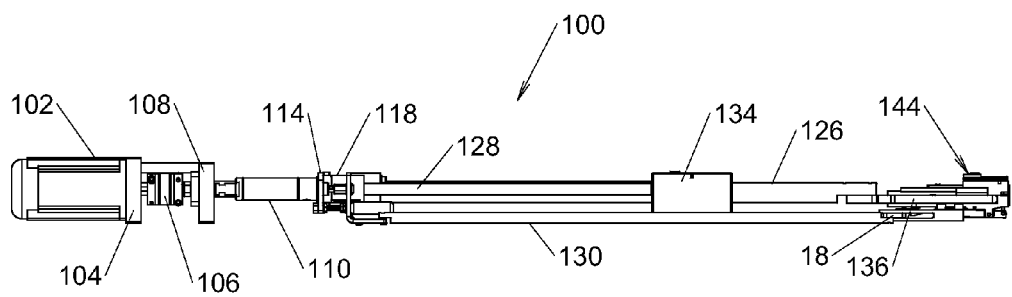
FIG. 2 shows a right side view of the embodiment of a film stretcher for a given axis.
Figure 3:
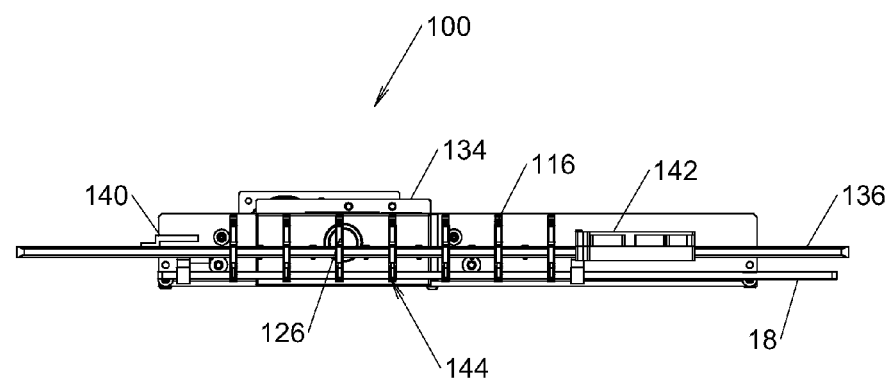
FIG. 3 shows a front view of the embodiment of a film stretcher for a given axis.
Figure 4:
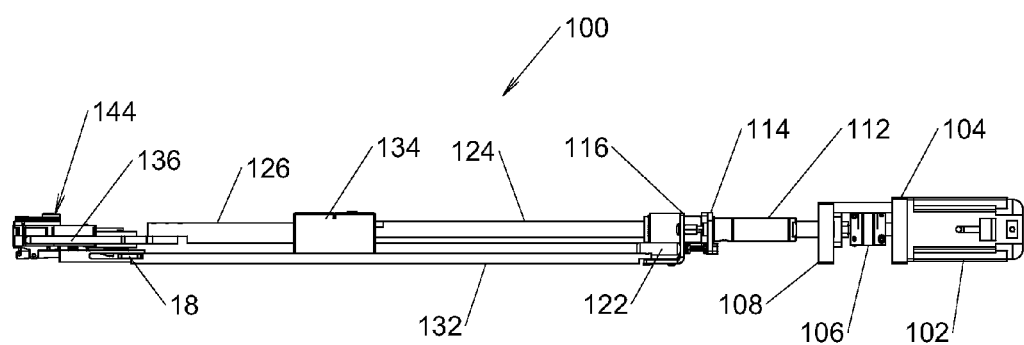
FIG. 4 shows a left side view of the embodiment of a film stretcher for a given axis.
Figure 5:
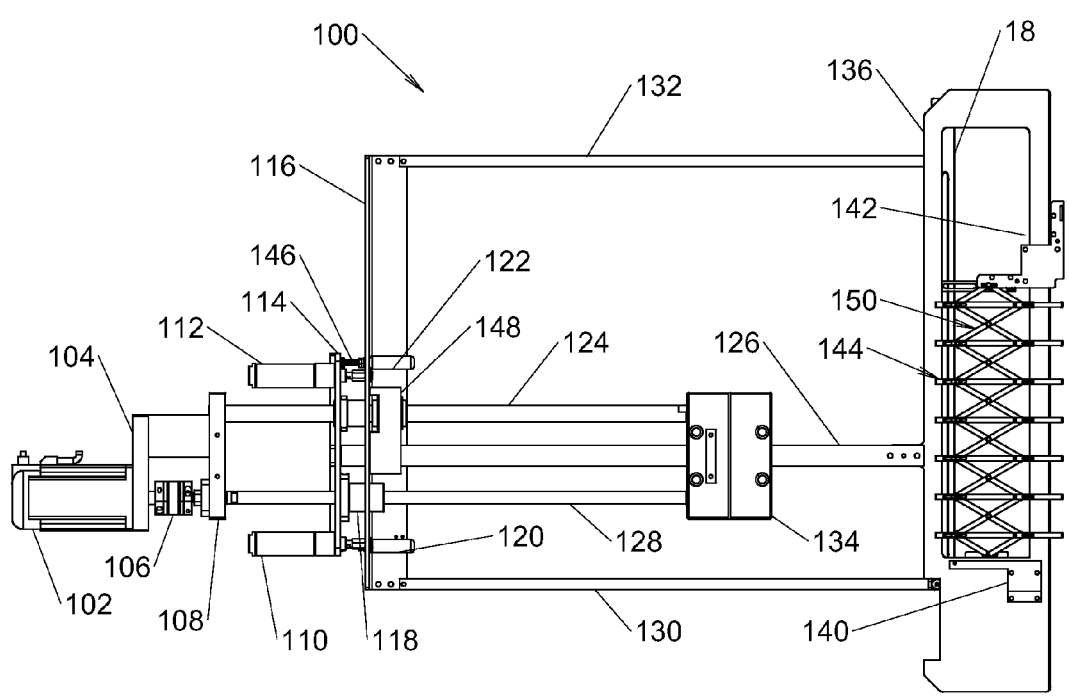
FIG. 5 shows a top view of the embodiment of a film stretcher for a given axis.
Figure 6:
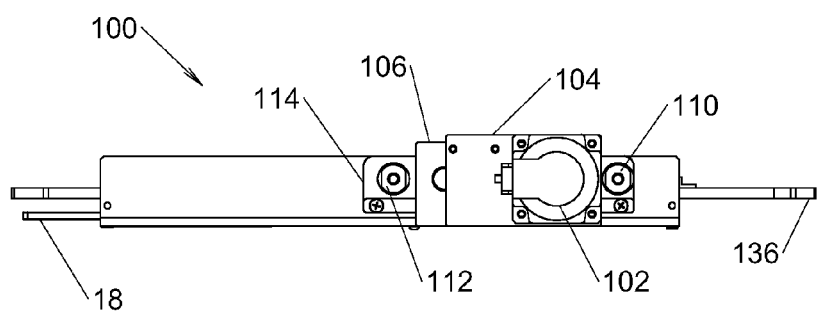
FIG. 6 shows a rear view of the embodiment of a film stretcher for a given axis.
Figure 7:
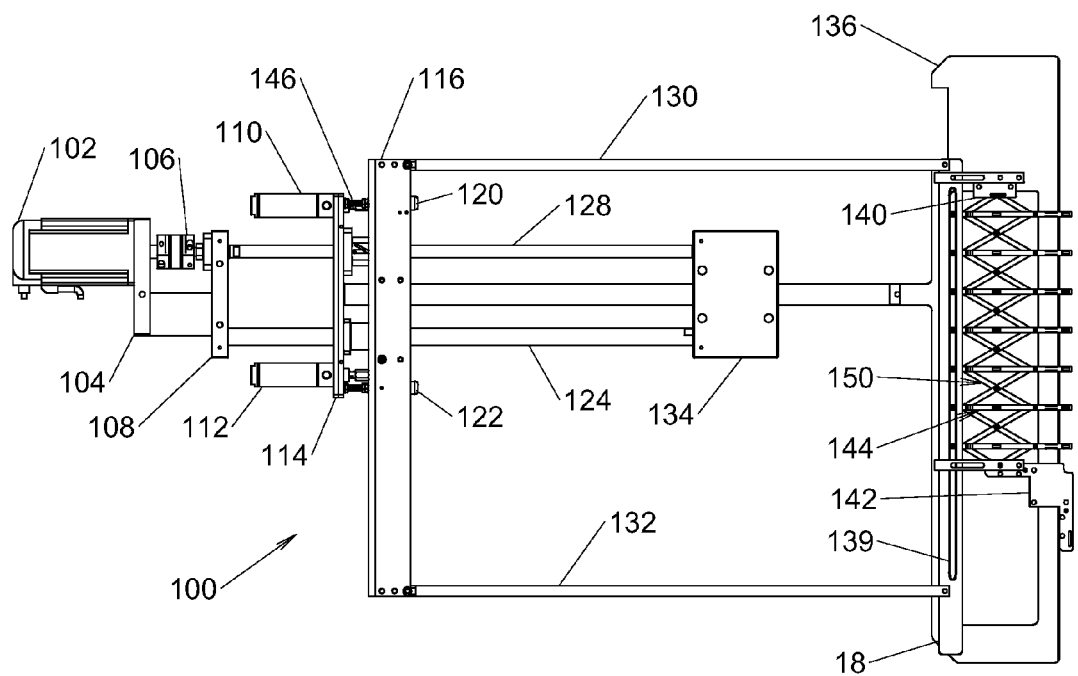
FIG. 7 shows a bottom view of the embodiment of a film stretcher for a given axis.
Figure 8:
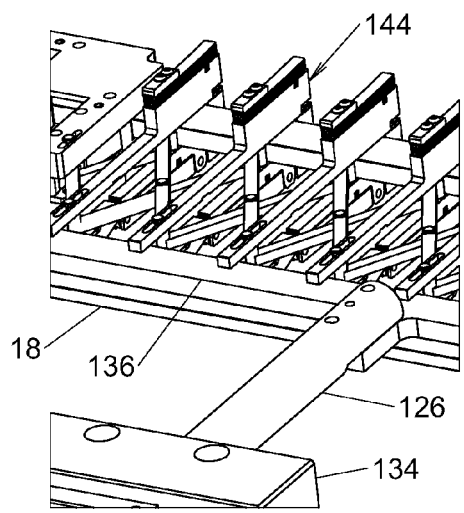
FIG. 8 shows a perspective view of a clamp area of the embodiment of a film stretcher for a given axis.
Figure 9:
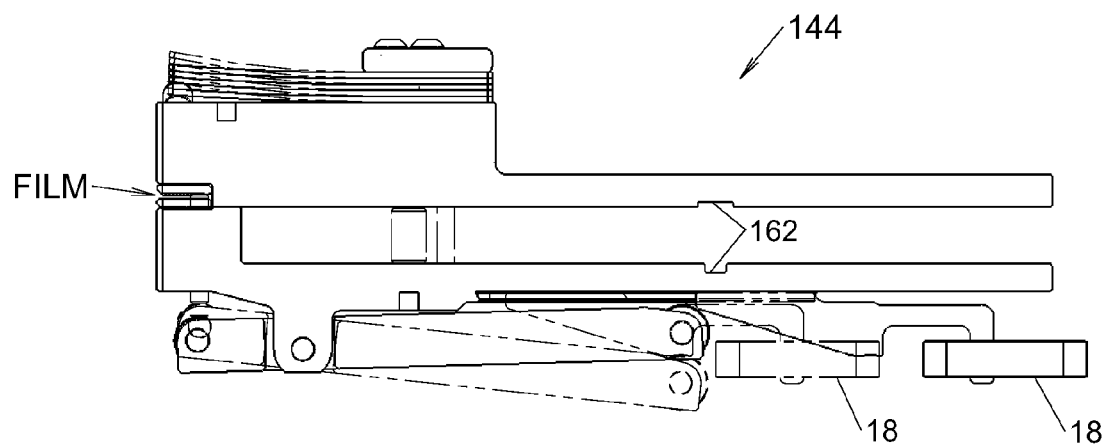
FIG. 9 shows a side view of an embodiment of a clamping finger for embodiments of a film stretcher.
Figure 10:
FIG. 10 shows a top view of the embodiment of a clamping finger for embodiments of a film stretcher.
Figure 11:
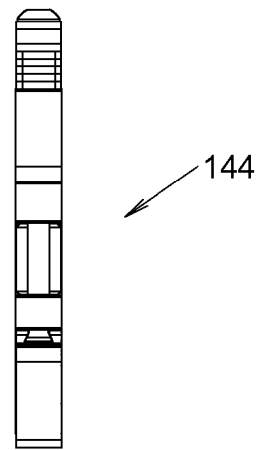
FIG. 11 shows a front view of the embodiment of a clamping finger for embodiments of a film stretcher.
Figure 12:
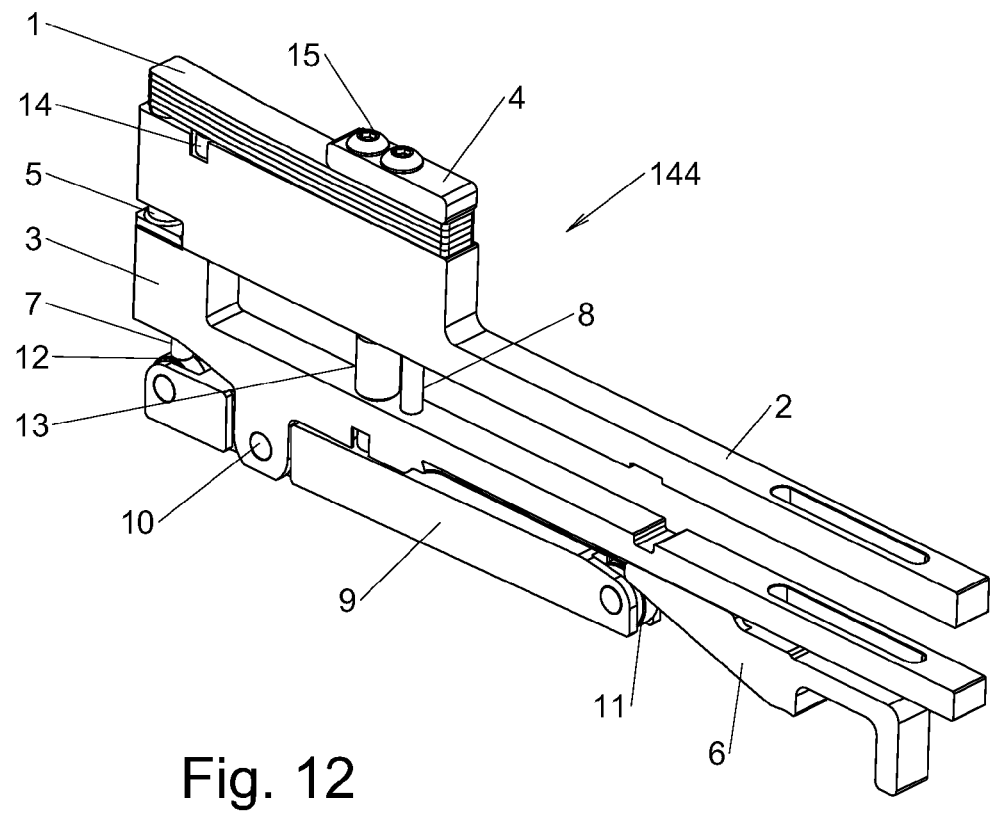
FIG. 12 shows a perspective view of the embodiment of a clamping finger for embodiments of a film stretcher.
Figure 13:
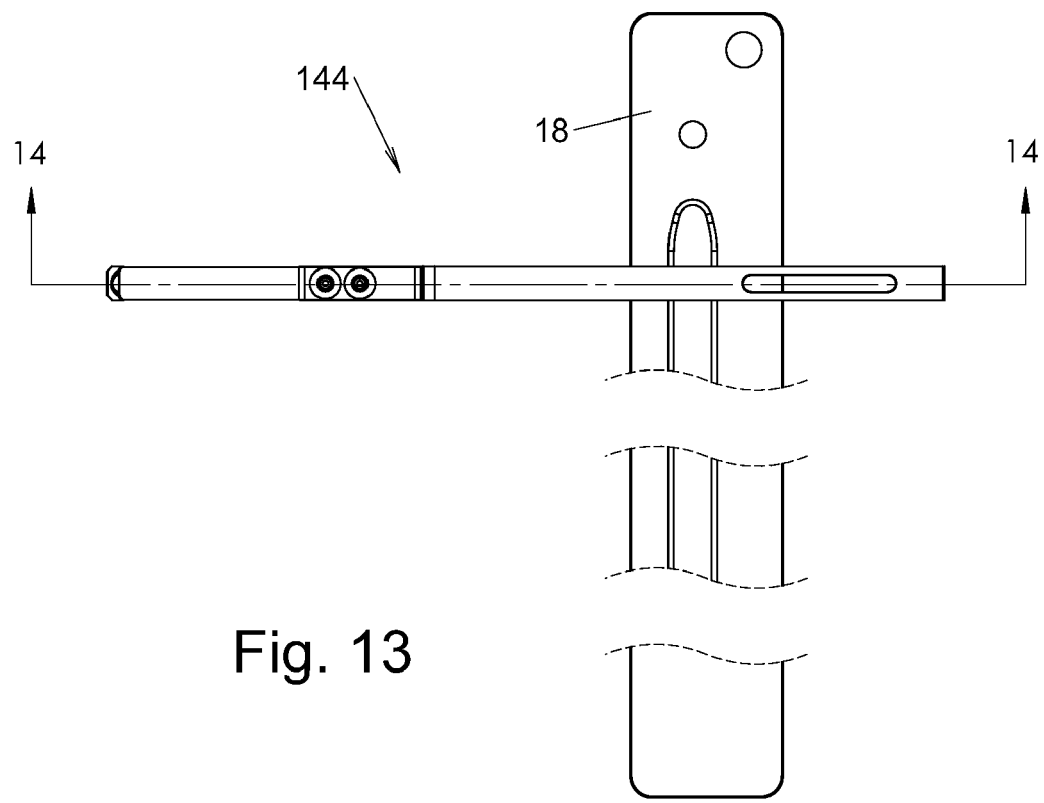
FIG. 13 shows a top view of the embodiment of the clamping finger when in a first position.
Figure 14:
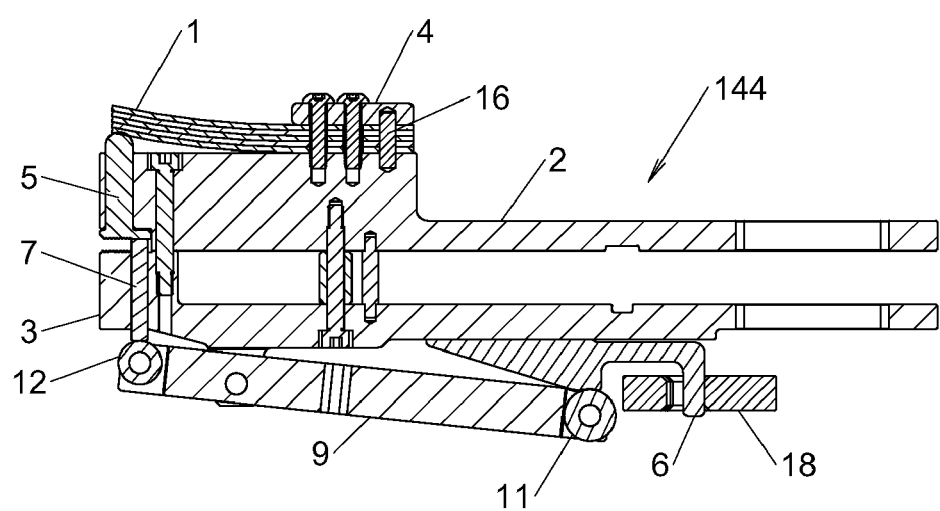
FIG. 14 shows a side cross-sectional view of the embodiment of the clamping finger when in the first position.
Figure 15:
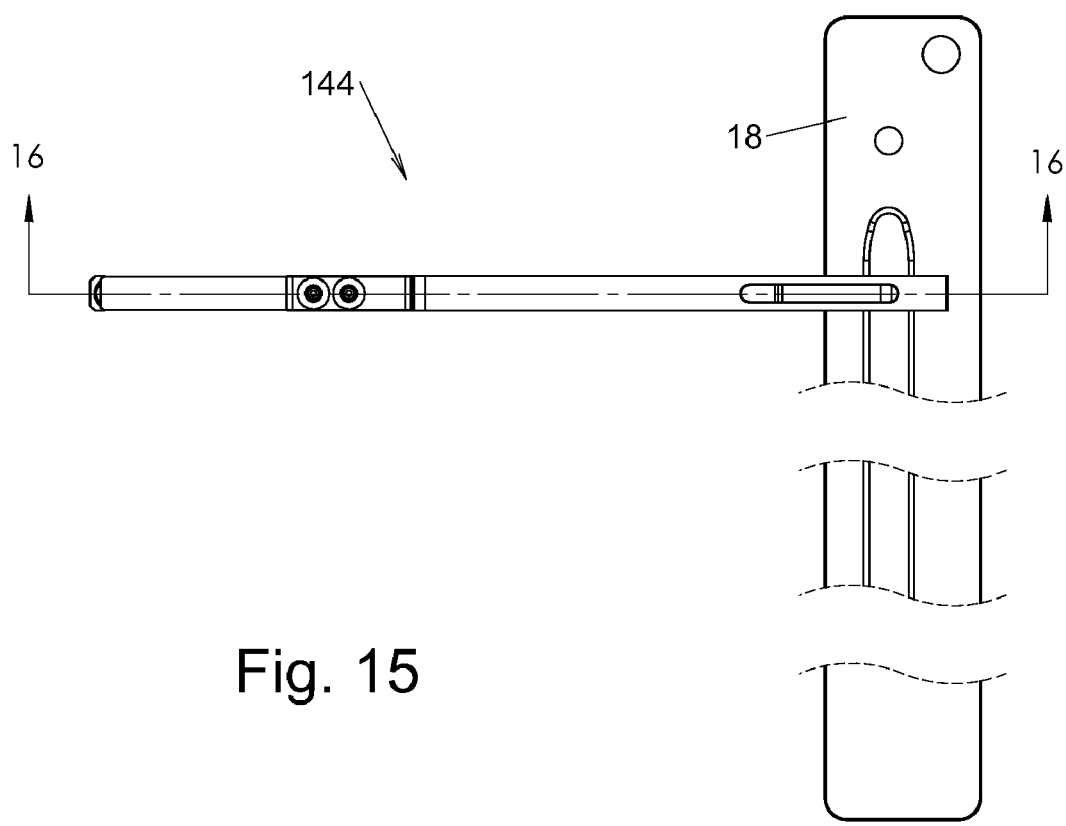
FIG. 15 shows a top view of the embodiment of the clamping finger when in a second position.
Figure 16:
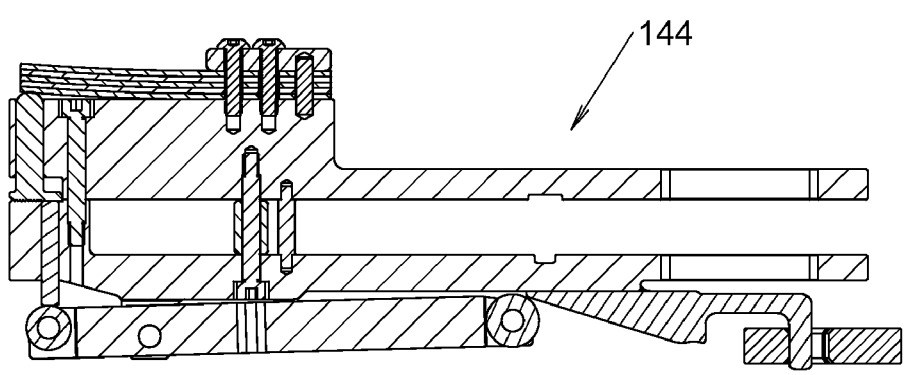
FIG. 16 shows a side cross-sectional view of the embodiment of the clamping finger when in the second position.
Figure 17:
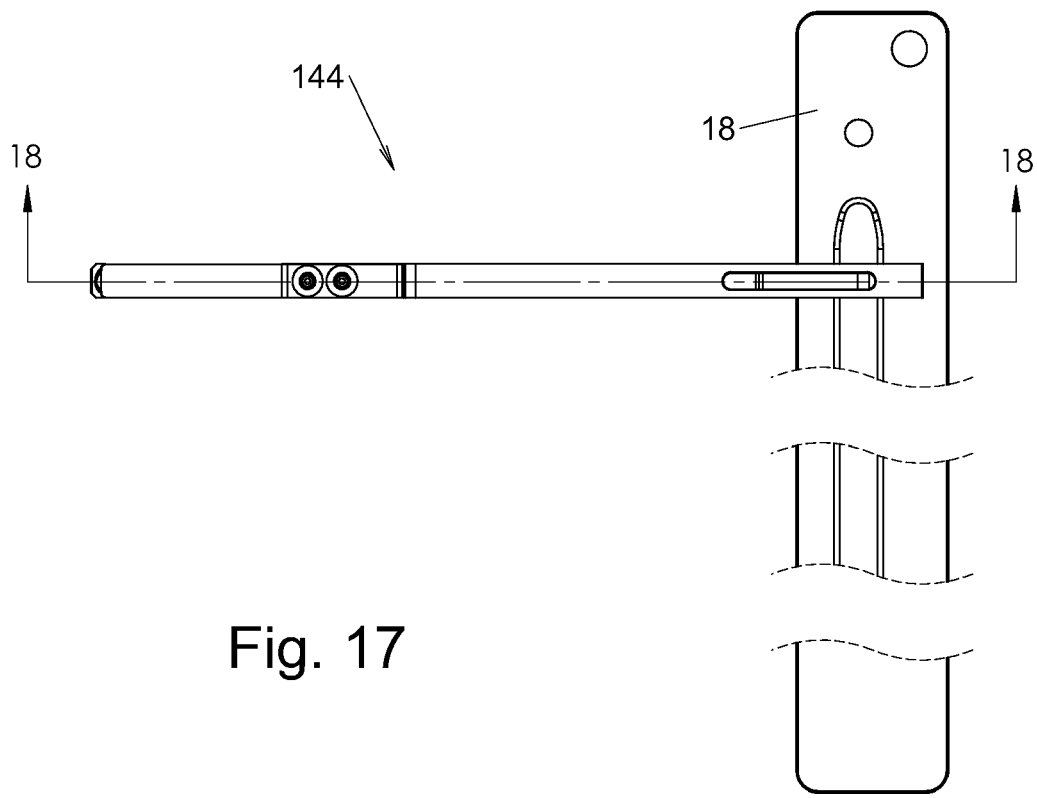
FIG. 17 shows a top view of the embodiment of the clamping finger when in a third position.
Figure 18:
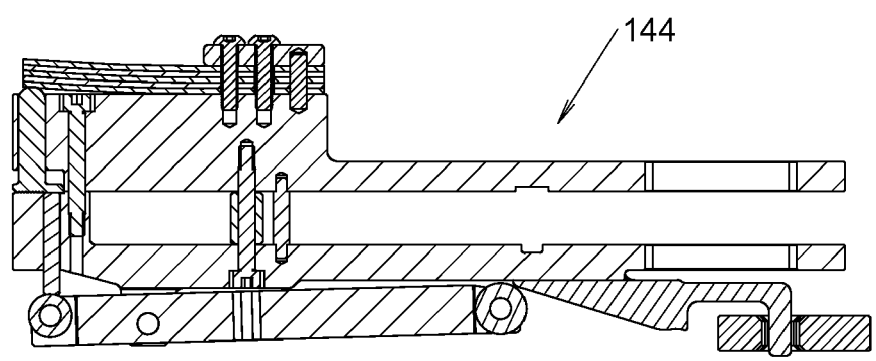
FIG. 18 shows a side cross-sectional view of the embodiment of the clamping finger when in the third position.
Figure 19:
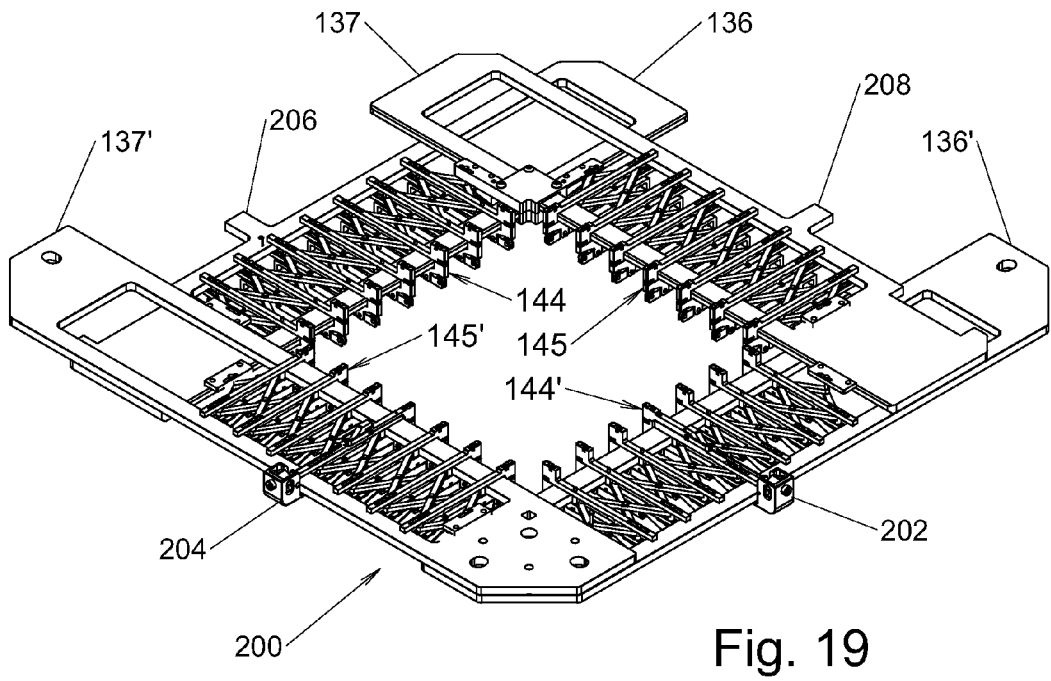
FIG. 19 shows a perspective view of an embodiment of a stretch head.

FIGS. 1-8 show an example of a film stretcher for one axis. This film stretcher 100 may be used in conjunction with a clamping mechanism on the opposite side that is either fixed, yet uses a same or similar clamping finger configuration, or one that is also mobile and uses the same or similar clamping finger configuration. As is also discussed below, this film stretcher 100 may additionally be used in conjunction with a clamping mechanism on each of the perpendicular sides where one side is mobile and the other is fixed or where both are mobile. The discussion below in relation to FIG. 19 presents an example of a stretch head that may utilize the film stretcher 100.

This illustrative embodiment of a film stretcher 100 includes an electric motor 102 such as the SGMAH08AAF41-1 servomotor from Yaskawa America Electric, Inc. of Waukegan, Ill. This motor 102 provides rotary movement that is used to slide the clamping assembly forward to attach to the film sample and then to pull the clamping assembly backward to begin stretching the film sample after the film sample has been clamped. It will be appreciated that the forward and backward motion may be provided in other manners for other embodiments of the film stretcher. For example, pneumatics may be utilized to provide this forward and backward movement.

The motor 102 of this embodiment is mounted to a plate 104 and has an output shaft coupling 106 to a drive screw 128.

Thus, as the motor 102 turns, the drive screw 128 also turns. The drive screw 128 extends to a guide block 134 where the drive screw 128 is supported but freely turns, such as via a bearing within the guide block 134. The plate 104 is attached to a torque plate 108. A support shaft 124 is affixed to and extends from the torque plate 108 to the guide block 134. Although not shown, the plate 104, torque plate 108, and guide block 134 may be mounted to a beam that holds these parts in a fixed relationship relative to one another. The guide block 134 maintains a fixed position, abutting the oven within which the film sample is being stretched.

In this embodiment a sub-assembly moves forward and backward as a unit as a result of activation of the motor 102 in order to provide the stretching of the film sample. This sub-assembly includes a draw plate 114, pneumatic cylinders 110, 112, a threaded coupling 118, an actuator shaft 126, and a primary D-ring (PDR) 136. The actuator shaft 126 extends into the oven where the PDR 136 is located.

As the drive screw 128 turns, the threaded coupling 118 is moved along the drive screw 128, either toward the guide block 134 or away from it depending upon the direction of the rotation of the drive screw 128 as provided by the motor 102. The threaded coupling 118 is rigidly attached to the draw plate 114 such that the draw plate 114 moves forward and backwards as well. The pneumatic cylinders 110, 112 and the actuator shaft 126 are also rigidly attached to the draw plate 114 and move accordingly. During this forward or backward movement, a supporting coupling 123 that is rigidly attached to the draw plate 114 slides along the support shaft 124.

Attached to the PDR 136 includes the clamping assembly that includes several individual clamping fingers 144 bounded by a fixed support 140 and a sliding support 142. Thus, as the motor 102 is activated, the actuator shaft 126 moves the PDR 136 and the attached clamping fingers 144. When the clamping fingers 144 are clamped down onto the film sample, then as the PDR 136 is pulled by the motor 102 toward the guide block 134, the film sample is stretched so long as the opposite side of the film sample is restrained.

In this embodiment another sub-assembly moves forward and backward as a unit together with the aforementioned sub-assembly in response to activation of the motor 102. This sub-assembly includes a secondary D-ring (SDR) plate 116, a floating guide block 148, pneumatic cylinders 120, 122, SDR shafts 130, 132 and an SDR 18. While this sub-assembly may move forward and backward as a unit with the aforementioned sub-assembly during activation of the motor 102, this sub-assembly may also move independently of the aforementioned sub-assembly in order to control whether the clamping fingers 144 are in the clamped or unclamped position.

Thus, upon the motor 102 moving the sub-assemblies forward to reach the starting point where the film sample is inserted, this sub-assembly activates independently of the aforementioned sub-assembly to move to a first position to open the clamps if necessary and to move to a second position to close the clamps upon introduction of the film sample. As discussed below, this sub-assembly may further move to a third position where the clamps remain closed but the mechanism for opening and closing the clamps is isolated from these sub-assemblies. This isolation may be provided to avoid a sudden acceleration during stretching from causing the clamps to open.

This sub-assembly maintains its movement as a unit with the previous sub-assembly by the pneumatic cylinders 110, 112 maintaining a fixed shaft position during the forward and backward movement of the draw plate 114. These pneumatic cylinders 110,112 have shafts that are fixed to the SDR plate 116 such that movement of the draw plate 114 results in corresponding movement of the SDR plate 116 so long as the pneumatic cylinders 110, 112 maintain the fixed shaft position.

One manner of maintaining the fixed shaft position of the pneumatic cylinders 110, 112 is by having the pneumatic cylinders 110, 112 bias into the most extended or most retracted shaft position (i.e., the internal piston is held by pneumatic pressure against its internal stop or against an external stop). As shown for this embodiment, the piston may reach its internal stop when the shaft position is fully extended. As is further shown in these figures, external stops 146 are provided to limit the retracted shaft position. As is discussed below, a state of spring bias of the clamping fingers 144 is controlled by the shaft position movement of the pneumatic cylinders 110, 112 to either open or close the clamps, and the external stops 146 may be used to limit the movement to match a range of movement that is accepted by the clamping fingers.

The movement of the shaft position of the pneumatic cylinders 110, 112 serves to move the SDR plate 116 relative to the draw plate 114. This also has the effect of moving the SDR shafts 130, 132 relative to the actuator shaft 126, and hence moves the SDR 18 relative to the PDR 136. The SDR shafts 130, 132 also extend into the oven where the SDR 18 is located. In this embodiment, the movement of the SDR 18 relative to the PDR 136 ultimately controls the state of spring bias of the clamping fingers 144 to either open or close the clamps.

The clamping fingers 144 are each interconnected in this embodiment by a scissor-like mechanism 150. The scissor-like mechanism 150 is anchored to the PDR 136 on one side by the fixed support 140 and is guided along the PDR 136 by the sliding support 142. The sliding support 142 glides along an outer leading edge of the PDR 136 and also glides along a groove or slot 139 formed in the SDR 18. As discussed below, the slot 139 is also pertinent to controlling the state of spring bias of the clamping fingers 144. Each of the clamping fingers 144 is able to move laterally along the PDR 136 in a manner controlled by the scissor-like mechanism 150. This movement is necessary when stretching is occurring in the axis that is perpendicular to the axis of stretch being provided by the film stretcher 100. This movement occurs because the distance between each clamping finger 144 increases as the film sample is stretched in that perpendicular axis.

Additional details of the clamping fingers of one illustrative embodiment are shown in FIGS. 9-18. In this particular embodiment, the clamp of the clamping finger 144 is provided by the force exerted by a clamp piston 5 onto a lower clamp finger 3 where an edge of a film sample is trapped between these two items. In this particular embodiment, the clamp piston 5, and hence the clamp, is biased to a closed position by a collection of leaf springs 1 upon a clamp rocker 9 being released from a detained state referred to as position 1. In this position 1 where a first spring bias state occurs, the SDR 18 has been pushed further from the guide block 134 by the pneumatic cylinders 110, 112, where the SDR 18 pushes against a slider 6. The slider 6 reaches a point where a precision washer 11 which acts as a roller rides along the slider 6 until entering a detent which coincides with the pneumatic cylinders 110, 112 reaching their internal piston stops. The slider 6 may glide along a track in the adjacent surface of the lower finger 3.

As shown, the rocker 9 serves as a lever about dowel pin 10 to push a dowel pin 7 via another precision washer 12 which in turn pushes the clamp piston 5. This push forces clamp piston 5 against the bias of the leaf springs 1 to separate the clamp piston 5 from the lower clamp finger 3. The film sample may be inserted to the opening between the clamp piston 5 and the lower finger 3. Then, the pneumatic cylinders 110, 112 draw the SDR 18 backwards until the pneumatic cylinders 110, 112 reach the stop, such as the external stop 146, which places the slider 6 in position 2 where a second spring bias state occurs. At this position, the slider 6 is out of contact with the rocker 9 which has been forced back into position by the bias of the leaf springs 1 against the clamp piston 5 and dowel pin 7. The film sample is now firmly clamped between the clamp piston 5 and the lower finger 3.

At this point, this illustrative embodiment takes further action to isolate the clamping from the acceleration of the PDR 136 and hence the SDR 18 during the stretching movements. The pneumatic cylinders 120, 122 are activated until reaching their stops in order to push the SDR 18 forward to a point where it is no longer in contact with the slider 6. Thus, violent acceleration of the SDR 18 during stretching movement avoids contact with the slider 6, and thus prevents any movement of rocker 9. Therefore, movement of clamp piston 5 is avoided so that the clamp does not introduce noise to the measurements and does not release the film sample.

The clamping finger 144 is constructed by mounting the leaf springs 1 atop an upper clamp finger 2. A retainer 4 may be placed above the leaf springs with screws 15 and dowel pins 16 holding the retainer 4 in place and with proper alignment. The preload of the leaf springs 1 may be set as desired by shimming the leaf springs 1 since the force applied by the leaf springs 1 is dependent upon displacement. The clamping finger 144 slides along the PDR 136 when stretching is occurring in the perpendicular axis so to facilitate that sliding, a D-ring roller 13 is included to roll along the adjacent surface of the PDR 136.

Furthermore, to mount to the scissor-like mechanism 150, the clamping finger 144 includes a dowel pin 8 that serves as a fixed attached point for one end of the scissor while the groove 160 in the upper finger 2 and lower finger 3 serves as a moving attachment point for the other end of the scissor. As the clamping fingers 144 are stretched apart, the attachment points of the scissor to the clamping finger 144 moves closer together, so the groove 160 allows for that movement of the attachment point relative to the dowel pin 8. Notches 162 in the upper finger 2 and lower finger 3 allow for clearance of scissor pins when the clamping fingers 144 are closest together.

Various materials may be used in constructing the film stretcher 100 and the clamping fingers 144. The components of the film stretcher 100 may include materials such as stainless steel, carbon steel, or aluminum. The components of the clamping fingers 144 may include materials capable of withstanding elevated temperatures such as stainless steel or carbon steel. In particular, the leaf springs 1 may be constructed of stainless steel (for example, grade 17-4) or Iconel (for example, grade 718).

FIG. 19 shows a stretch head 200 for providing biaxial stretching using at least two film stretchers with at least one for each axis. In this example, it can be seen that the PDR 136 is on one side of the film sample while another PDR 136' is on the opposite side. The PDR 136' may maintain a fixed position so that the amount of stretching in this particular axis is provided entirely by the movement of the PDR 136. However, even if fixed, this PDR 136' still provides a set of clamping fingers 144' that may operate to clamp and un-clamp in the same manner as the clamping fingers 144 and that may slide along the PDR 136' in response to stretching in the perpendicular axis. A force transducer 202, such as a piezoelectric force sensor, may also be present to make the force measurements during the stretching.

As is also shown in FIG. 19, the perpendicular axis may mirror the present axis by providing a PDR 137 and another PDR 137' on the opposite side of the film sample. The PDR 136 may be driven by a film stretcher like the film stretcher 100 discussed above. The PDR 137' may be driven, or as shown may be fixed like PDR 136'. In either case, both the PDR 137 and PDR 137' may utilize the same mechanism for clamping as discussed above. A force transducer 204 may be present to measure the force in this perpendicular axis.

As can be seen, the PDRs 136, 136' overlap with the PDRs 137, 137' of the perpendicular axis. Thus, this overlap is accounted for by elevating the PDRs 137, 137' relative to the PDRs 136, 136'. The geometry of the clamping fingers 145, 145' differ from that of the clamping fingers 144, 144' so as to account for the elevation difference of the PDRs while maintaining the clamp position at the same elevation for all clamping fingers 144, 144', 145, and 145'. Furthermore, the SDR shafts 130, 132 and SDR 18 are at different elevations for the PDR 137 to avoid collisions with the PDRs 136, 136'. As can also be seen, the mounting tab 206, 208 for the actuator shaft 126 is off-center of the PDR 136, 137 in this example since the opposite sides are fixed and the film sample grows outward from one of its corners rather than expanding from its center.

Figure 20:
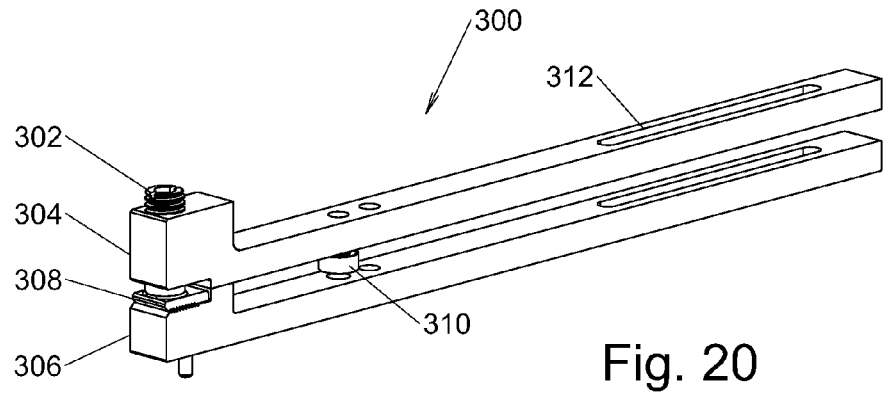
FIG. 20 shows a perspective view of an alternative embodiment of a clamping finger for embodiments of a film stretcher.
Figure 21:
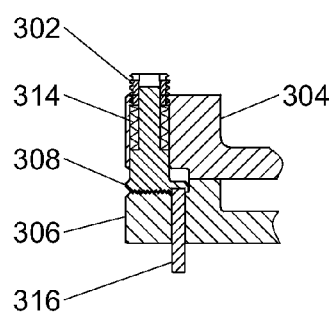
FIG. 21 shows a cross-sectional side view of the alternative embodiment of the clamping finger for embodiments of a film stretcher.

FIG. 20 shows a portion of a clamping finger 300 with an alternative spring bias mechanism. In this example, either disk springs or coil springs 314 are being used to bias the clamp rather than leaf springs. In this example a clamp piston 308 is being biased toward a lower finger 306 by a collection of disk or coil springs 314 located within an upper finger 304 while the clamp piston 308 biases a dowel pin 316 toward a rocker (not shown). The disk or coil springs 314 may be pre-loaded with an adjustment screw 302 that threads down into the upper finger 304.

In this embodiment, other details may be the same as or similar to the previous embodiment 144, such as including a D-ring roller 310 to roll along an adjacent surface of the PDR 136 and groove 312 to allow for movement of the adjoining end of the scissor. Furthermore, the dowel pin 316 and clap piston 308 may be moved by a rocker being positioned by movement of a slider as discussed above for the previous embodiment of the clamping finger 144.

While various embodiments of film stretchers and particularly clamping fingers have been disclosed, it will be appreciated that various changes in the details may be made while still falling within the scope of the invention.

What is claimed is:

1. A stretch head, comprising:
   at least one clamp;
   a first body upon which the at least one clamp is mounted;
   a first drive mechanism mechanically coupled to the first body to move the first body in two opposing directions;
   a second drive mechanism mechanically coupled to the first drive mechanism so as to be moved in the two opposing directions by the first drive mechanism;
   a second body mechanically coupled to the second drive mechanism so as to be moved in the two opposing directions by the first drive mechanism and so as to be moved in two opposing directions by the second drive mechanism, the second body engaging the at least one clamp so as to transition the clamp to an unclamped state upon the second body being moved in one direction by the second drive mechanism and so as to transition the clamp to a clamped state upon the second body being moved in another direction opposite the one direction by the second drive mechanism, wherein the clamp comprises a first clamp finger providing a surface upon which a film to be stretched rests, a piston biased toward the surface of the first clamp finger by at least one spring, and a rocker that is mechanically coupled to the piston so as to apply a counter force to the piston to bias the piston away from the surface first clamp finger when the rocker is moved in a first direction and to reduce the counter force to allow the piston to abut the film and the surface of the first clamp finger when the rocker is moved in a second direction, and wherein the movement of the rocker occurs in relation to movement of the second body.

2. The stretch head of claim 1, wherein the first drive mechanism comprises an electric motor.

3. The stretch head of claim 1, wherein the second drive mechanism comprises at least one pneumatic cylinder.

4. The stretch head of claim 1, wherein the first body comprises a primary D-ring and the second body comprises a secondary D-ring.

5. The stretch head of claim 1, wherein the clamp further comprises a slider that engages the second body and that engages the rocker, the slider including a detect that holds the rocker in a fixed position that results in the piston being held away from the surface of the first clamp finger so as to unclamp the film.

* * * * *